United States Patent [19]
Leen

[11] 3,782,487
[45] Jan. 1, 1974

[54] WEIGHT ANNUNCIATOR
[76] Inventor: Morris W. Leen, 2911 Saddle Ridge Dr., Yorktown Heights, N.Y. 10598
[22] Filed: June 22, 1972
[21] Appl. No.: 265,211

[52] U.S. Cl. ............................... 177/245, 177/201
[51] Int. Cl. ........................................... G01g 23/00
[58] Field of Search ..................... 177/201-205, 245

[56] References Cited
UNITED STATES PATENTS
718,500   1/1903   Moore ........................... 177/245 X
2,065,964  12/1936  Brown ........................... 177/245 X

Primary Examiner—George H. Miller, Jr.
Attorney—Irving Seidman et al.

[57] ABSTRACT

A weight annunciator for announcing the weight of a load placed on a weighing machine of the type having a platform adapted to be moved to a loaded position which is related to the value of the weight placed on the platform. A record having weight announcement segments sequentially recorded thereon is provided and is adapted to move past a reading station which includes a reading device for converting the weight announcement segments into audible information. A moving arrangement responsive to the movement of the platform to the loaded position is adapted to move the record to a position wherein the weight announcement segment associated with the value of the weight on the platform is positioned at the reading station. Thereafter, relative movement between the reading device and the record is effected whereby the weight announcement positioned at the reading station is read out.

21 Claims, 15 Drawing Figures

WEIGHT ANNUNCIATOR

The present invention relates generally to an annunciator and, more particularly, pertains to a device for producing an audio indication of the weight of an object.

Existing home-use scales of the type used in bathrooms or the like to indicate the weight of a person suffer from a number of drawbacks which render it practically impossible for the person using the scale to accurately determine his weight. Among these drawbacks is the fact that the weight graduations are difficult to read because the viewing aperture is extremely small and the magnifying windows, rather than eliminating the already ambiguous readings, tend to distort the same. In addition, people with common physical impairments such as myopia or undue obesity find it virtually impossible to read these conventional weight scales.

Accordingly, an object of the present invention is to provide an improved scale.

A more specific object of the invention is to provide a scale with an announcement machine for announcing the value of a weight applied to the platform of the scale.

Another object of the invention is to provide an accurate scale which announces the value of a weight applied thereto.

A further object of the invention is to provide a weight annunciator which is simple in construction and efficient in operation.

Another object of the invention resides in the novel details of construction which provide a weight annunciator of the type under consideration which is reliable in operation.

Accordingly, a weight annunciator constructed according to the present invention comprises a machine for use with a weighing machine of the type having a platform adapted to be moved from a rest to a loaded position which is related to the value of the weight placed on the platform. A reading station and recording means having weight announcement segments recorded thereon are provided. A scale disc is connected to the platform and is adapted to be rotated through an angle proportional to the movement of the platform. Moving means is operatively associated with the disc for effecting movement between the recording means and the reading station to position the weight announcement segment corresponding to the angle of rotation of the disc at the reading station. Reading means converts the weight announcement segment positioned at the reading station into audible information.

A feature of the present invention is to provide a recording containing the weight announcements thereon for quickly reading-out the weight of the load as soon as the scale platform comes to rest.

Other features and advantages of the present invention will become more apparent from a consideration of the following detailed description when taken in conjunction with the accompanying drawings, in which:

As noted hereinabove, the present invention will be described in conjunction with a weight annunciator for home use such as a conventional bathroom scale. However, it is to be noted that the invention is not limited to this particular use of the weight annunciator but the weight annunciator of the present invention may be utilized for any weight measurement such as in butcher shops, supermarkets, and the like.

Figure 1:
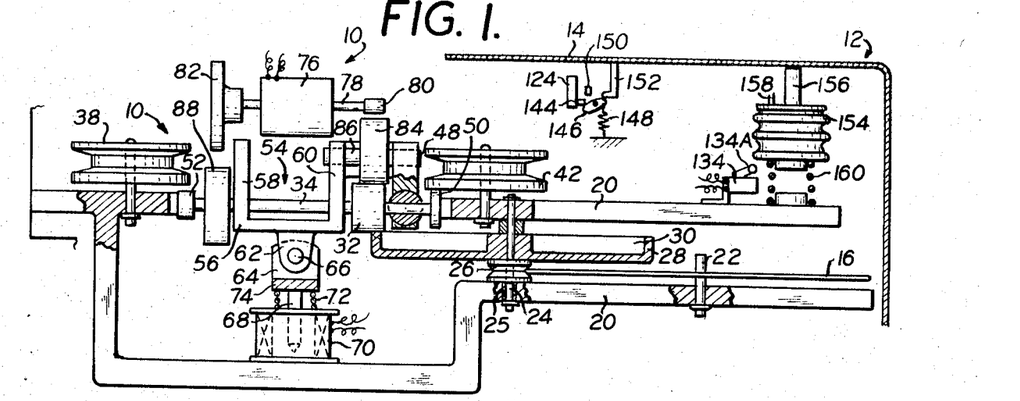
FIG. 1 is a front elevational view, partially in schematic and partially diagrammatic, illustrating a weight annunciator constructed according to the present invention.
Figure 2:
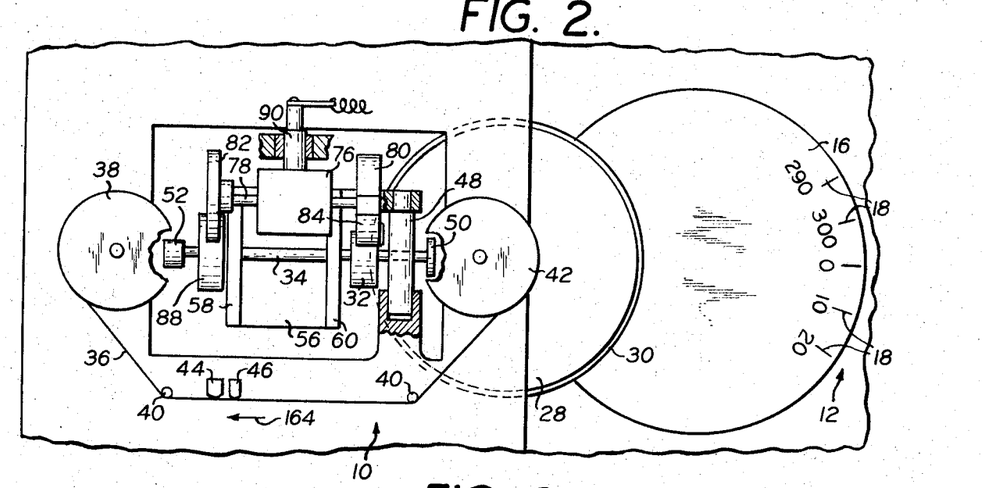
FIG. 2 is a top plan view thereof with parts broken away in the interest of clarity.

A weight annunciator or announcement machine constructed according to the present invention is illustrated in FIGS. 1 and 2 and is designated generally by the reference numeral 10. The weight annunciator is adapted to be used in conjunction with a conventional weighing machine or scale designated generally by the reference numeral 12. The scale 12 includes a movable platform 14 on which the object to be weighed is placed. The platform 14 moves downwardly as taken in FIG. 1 in response to the weight thereon until it reaches a loaded position wherein the distance of travel of the platform is proportional to the value of the weight on the platform. The scale 12 further includes a rotatable disc 16 having weight indicia 18 thereon, as shown in FIG. 2. An appropriate linkage (not shown) between the platform and the disc 16 causes the disc 16 to rotate through an angle proportional to the distance of travel of the platform and, therefore, to the value of the weight on the platform. Since this linkage arrangement is conventional and may be found in any scale, it is not shown in detail herein.

The annunciator 10 includes a bed or frame 20 which supports an upstanding shaft 22. The disc 16 is rotatably mounted on the shaft 22. Additionally, the frame 20 rotatably supports a shaft 24 via bearings 25. Fixedly received on the shaft 24 is a frictional roller 26 which is in engagement with the disc 16 so that rotation of the disc 16 causes concomitant rotation of the shaft 24. Also fixedly received on the shaft 24 is a crown disc 28 having a much larger diameter than the roller 26. The disc 28 is provided with an upstanding peripheral wall 30 which is adapted to engage and rotate a roller 32 fixedly received on a shaft 34, as noted in greater detail hereinbelow. In view of the variation in diameters between the discs 16 and 28 and the roller 26 (i.e., the large diameter disc 16, the relatively small diameter roller 26 and the relatively large diameter disc 28) the linear speed of the wall 30 of the disc 28 will be much greater than the speed of the indicator or scale disc 16 to provide an adequate length of tape for the recording.

In general, the weight announcements of the weight annunciator 10 are recorded sequentially on a conventional magnetic tape 36 (FIG. 2) which is normally stored on a feed roll 38. The tape extends in a predetermined path about the spaced idler rollers 40 and is connected to a take-up roll or reel 42. Read heads 44 and 46 are positioned adjacent the tape 36 for the reasons noted below. The driving arrangement, which includes the disc 16, the roller 26, the disc 28, the roller 32 and the shaft 34 are adapted to drive the take-up reel 42 as the platform 14 moves from the rest to the loaded position. Accordingly, the tape 36 will be moved a linear distance which is proportional to the value of the weight on the platform. In practice, each weight announcement segment is of equal length and is synchronized to the movement of the platform so that when the platform has moved to a particular level, the announcement segment for the value of the weight on the scale will be positioned adjacent the head 46.

More specifically, as noted in greater detail below, the shaft 34 is carried in a yoke 56 which is pivotally connected at 48 to a section of the bed or frame 20. The shaft 34 terminates at its right-hand end as taken in FIG. 1 in a roller 50 which may be fabricated from metal or the like which is adapted to be moved into and out of engagement with the take-up reel 42 which may be carried on a rubber faced disc as the yoke 56 is pivoted about the connection 48. Thus, for one position of the roller 50, the roller will be pivoted into driving engagement with the take-up reel 42 to cause the tape 36 to unwind from the feed reel 38 and onto the take-up reel 42. On the other hand, the roller 50 may be pivoted out of engagement with the reel 42.

The other end (left-hand end as taken in FIG. 1) of the shaft 34 terminates in a frictional roller 52 which likewise may be fabricated from metal or the like. The roller 52 is carried by yoke 56 into driving engagement with the feed reel 38 which may be mounted on a rubber faced disc to drive the feed reel to rewind the tape 36. As will be obvious from FIG. 1, when the elements are in the positions shown in FIG. 1 the roller 50 will be in driving engagement with the reel 42 and the roller 52 will be disengaged from the reel 38. However, when the yoke 56 is pivoted about the connection 48, the roller 52 will drivingly engage the reel 38 while the roller 50 will be pivoted out of engagement with the reel 42.

The movement of the shaft 34 is controlled by a pivot control designated generally by the reference numeral 54. The pivot control 54 includes a yoke 56 having upstanding spaced arms 58 and 60 which rotatably support the shaft 34. Depending from the height of the yoke 56 is a tang 62 which is connected to a member 64 by a pivot pin 66. The member 64 includes a depending core 68 of a solenoid electromagnet 70. Moreover, a spring 72 extends between the solenoid 70 and an abutment 74 on the member 64 thereby biasing the member and the yoke 56 upwardly. In effect, therefore, the yoke 56 is normally biased about the pivotable connection 48 so that the roller 52 normally engages the feed rell 38 and roller 50 and disc 28 are respectively disengaged from the take-up reel 42 and roller 32. On the other hand, when the solenoid 70 is energized, the core 68 is pulled downwardly thereby causing the yoke 56 to pivot to the position shown in FIG. 1.

Movement of the tape 36 during the interval that a recorded announcement is to be read-out is controlled by a reversible motor 76. The motor 76 is provided with an output shaft 78 having a small diameter roller 80 mounted on the right-hand end and a large diameter roller 82 mounted on the left-hand end, as taken in FIG. 1. The motor 76 is pivotally mounted to the bed or frame 20, as noted in greater detail below. FIG. 1 illustrates the position of the motor 76 when a weight or object is placed on the platform 14. Accordingly, the small diameter roller 80 is in meshing engagement with a large diameter idler roller 84 which is rotatably mounted on the yoke 56 by a shaft 86. The idler roller 84 is continuously in engagement with roller 32. In other words, the roller 80 is adapted to rotate the roller 32 via the idler roller 34 when the yoke 56 is pivoted to the position wherein roller 52 engages feed reel 38. When the object is removed from the platform 14 and the platform is in the rest position, the motor 76 is adapted to be pivoted to a position whereby the large diameter roller 82 engages a roller 88 on the shaft 34 to drive the feed reel 38 via the roller 88, shaft 34 and roller 52, to rewind the tape on the feed reel. Since the diameter of the roller 82 is relatively large compared to the roller 88, the speed of the reel 38 during rewind will be correspondingly fast.

Figures 6, 7, 9:
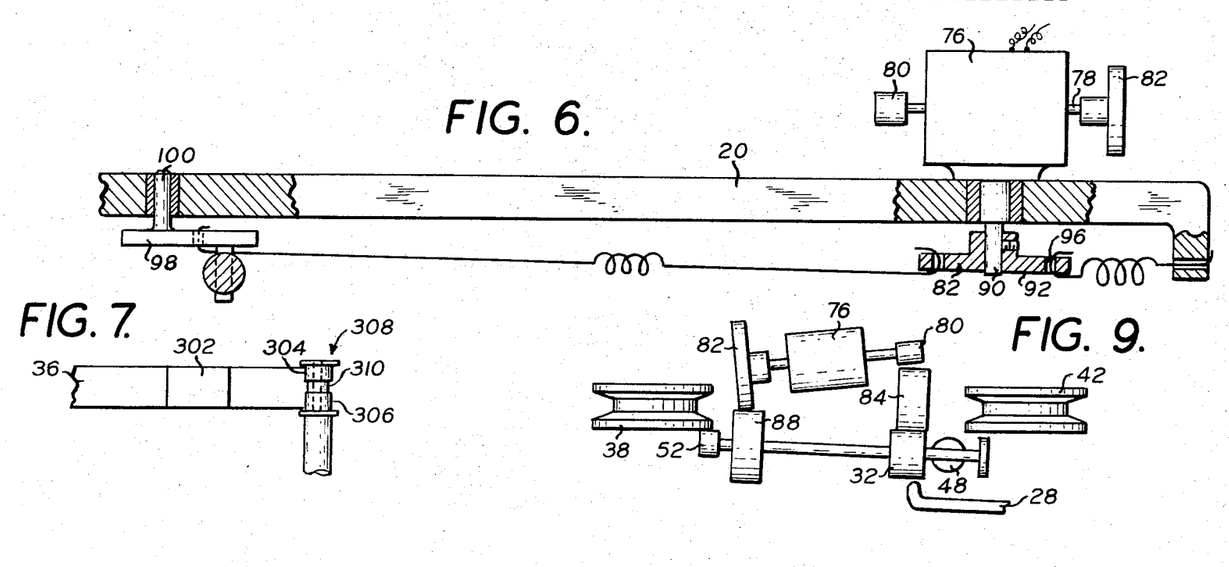
FIG. 6 is a top plan view of the motor pivoting arrangement, with parts broken away and removed in the interests of clarity.
FIG. 7 is a detailed view of the motor control switch portion of the present invention.
FIG. 9 is a detail view similar to FIG. 3 illustrating the arrangement of the drive elements during rewind of the record.

As shown in FIG. 2, the motor 76 is provided with a rearwardly extending pin 90 which is rotatably received through a portion of the frame 20. Connected to the end of the pin 90 is a plate 92. A biasing spring 94 extends between the bed 20 and a hole 96 in the plate 92. The spring 94 is adapted to bias the motor via the plate 92 and the pin 90 to the rewind position wherein the gear 82 engages the gear 88, as shown in FIG. 9.

Pivoting of the motor to the position shown in FIG. 1 is accomplished by means of a plate 98 which is connected by a pivot pin 100 adjacent one corner thereof to the frame 20. The spring 102 is adapted to rotate the plate 92 and thereby the motor 76 in a counterclockwise direction as taken in FIG. 4. However, the action of the spring 102 is not continuous since rotation of the motor stops when rollers 80 and 84 engage. The spring constant of the spring 94 is less than the constant of the spring 102 so that the motor 76 is normally biased in the clockwise direction as taken in FIG. 4.

Figure 4:
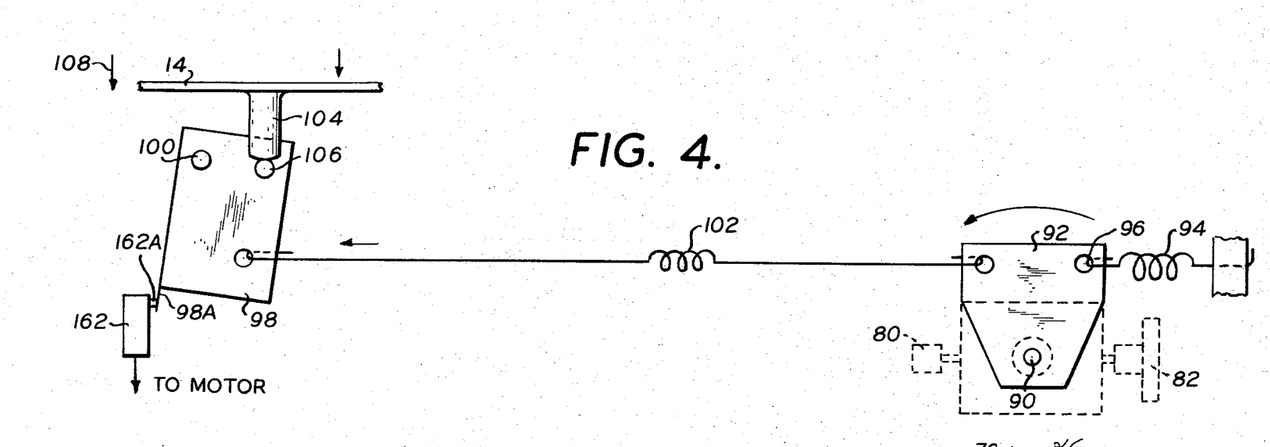
FIG. 4 is a rear elevational view, partially in diagrammatic form, of the motor pivoting arrangement.

On the other hand, the motor 76 is adapted to be rotated in the counterclockwise direction, as taken in FIG. 4 when weight is applied to the platform 14. More specifically, the platform 14 is provided with a depending foot 104 which is normally vertically above a transversely extending pin 106 on the plate 98. When an object is applied to the platform 14, the platform moves downwardly as indicated by the arrowhead 108 in FIG.

4. Thus, a downward force is exerted on the pin 106 through the foot 104 thereby pivoting the plate 98 clockwise about the pivot 100. This action causes a force to be applied to the plate 92 in a counterclockwise direction via the spring 102 thereby causing the motor 76 to pivot to the position shown in FIG. 1.

Obviously, when the weight is removed from the platform 14, the platform will move upwardly to its rest position thereby permitting the plate 98 to rotate back to its normal position and, consequently, the motor 76 will assume the rewind position.

The motor 76 may be energized in a number of different ways. For example, the motion sensing switch 134 shown in FIG. 8 may cause the motor to be energized through a relay or the like similarly to the relay 231 of FIG. 15. Moreover, the leader of the tape 36 (FIG. 7) may be provided with a conductive strip 302 which is adapted to electrically connect together an upper (304) and a lower (306) conductive portion of a roller 308, the portions being separated by an insulating member 310. As noted in greater detail with respect to the description of FIG. 15, the conductive portions 304 and 306 may be connected to respective ends of the relay controlling the energization of the motor 76 so that when the strip 302 bridges the portions 304 and 306, the portions and therefore the relay will be shorted (similarly to the relay 231 in FIG. 15) thereby deenergizing the motor. Since the strip 302 is one the tape leader, it is obvious that the motor will be energized only when the tape has been rewound on the feed reel. That is, since initial movement of the tape is controlled by the disc 16, the conductive strip 302 will initially move past the roller 308 to insure that the motor will not be deenergized until the tape has been rewound.

Figure 8:
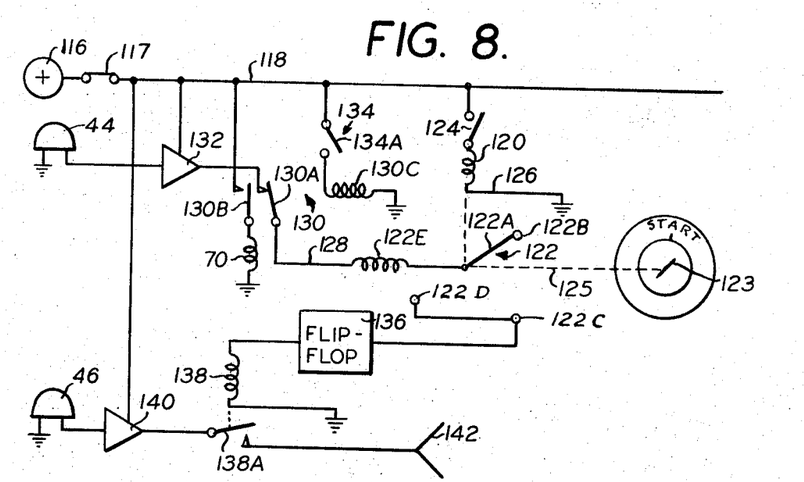
FIG. 8 is a schematic circuit wiring diagram of the audio control circuit of the present invention.

The audio and operating circuits of the present invention are illustrated in FIG. 8 and include a source of energy 116 having one terminal connected to a lead 118 and the other terminal (not shown) connected to ground. The lead 118 is connected to the operating coil 120 of a stepping switch 122 through a single-pole single-throw switch 124 which is adapted to momentarily close when weight is applied to the platform 114. The other end of the coil 120 is connected to ground by a lead 126. The coil 120 is adapted to move the armature 122A of the switch 122 between the terminals 122B, 122C and 122D in response to pulses applied to the stepping coil. The armature 122A of the switch 122 is connected by a lead 128 to the normally closed contacts 130A of a relay 130 through an additional stepping coil 122E of the stepping switch. The other side of the contacts 130A is connected to the output of an amplifier 132 the input of which is connected to the read head 44. The relay winding 130C is connected between the lead 118 and ground through a normally open micro-switch 134. Additionally, the relay 130 includes normally open contacts 130B which are serially connected between the lead 118 and the solenoid 70; the other end of the solenoid 70 being connected to ground.

The terminal 122B of the switch 120 is unconnected. On the other hand, the terminals 122C and 122D are connected to the input of a bistable multivibrator or flip-flop 136, the output of which is connected to one end of a relay winding 138. The other end of the relay winding is connected to ground. The read head 46 is connected to the input of an amplifier 140 the output of which is connected to a speaker 142 through the normally open contacts 138A of the relay 138.

The flip-flop 136 may comprise a so-called JK flip-flop so connected so that pulses will be applied to the clock input of the bistable device. Hence, each time a pulse appears at the input of the flip-flop 136 it will change status thereby alternately energizing and deenergizing the relay winding 138. However, although a bistable multivibrator is illustrated herein it is to be noted that this is for illustrative purposes only since any bistable device may be used in place thereof.

In practice, a control signal is recorded between each one of the weight announcements segments on the tape 36. This control signal may take the form of an inaudible signal so that it cannot be heard during the read-out of a weight announcement. Hence, the amplifier 132 may be frequency selective so that it only amplifies these inaudible frequency signals to produce a pulse thereby. On the other hand, the amplifier 140 may be made frequency selective so that it does not pass these inaudible pulses. Alternately, two channels may be used wherein the control signals are recorded in one channel and the weight announcements on the other.

As noted above, the switch 124 is closed only momentarily as weight is added to the platform 14. Thus, as shown in FIG. 1, the switch 124 includes a push button 144 which, when depressed, closes the switch 144. Pivotally mounted on the frame 20 adjacent the button 144 is an elliptical cam 146 which, when rotated in the clockwise direction, will depress the button 144. A spring 148 biases the cam 146 into engagement with the button 144 but is insufficient to cause the button to be depressed. A cam member 152 depends from the platform 14 and is normally in engagement with the cam 146. As weight is added to the platform 14 the platform and therefore the cam member 152 move downwardly thereby causing the cam 146 to rotate in a clockwise direction to depress the button 144. Overtravel of the cam 146 is prevented by a stop 150. As the cam member 152 passes the cam 146, the pushbutton 144 extends outwardly thereby causing the switch 124 to open. When weight is removed from the platform 14 and the platform returns to its rest position, the cam member 152 engages the cam 146 and rotates the same in a counterclockwise direction until the member passes the cam 146. The spring 148 then rotates the cam back to its initial position so that the member 152 can engage and rotate the cam 146 when the platform 114 is again depressed.

The switch 134, which is closed during movement of the platform from the rest to the loaded position, is mounted on the raised portion of the bed or frame 20 and the armature 134A of the switch 134 is positioned in the path of movement of an air bellows 154. The bellows 154 is mounted on the platform 114 by a depending member 156 and includes an air escape opening 158. A spring 160 of relatively low force constant extends between the raised portion of the bed 20 and the bellows 154. As noted in greater detail below, the bellows 154 operates to initially close the switch 134 as the platform moves from the rest to the loaded position and for a slight interval of time thereafter.

The direction of rotation of the motor 76 is controlled by a microswitch 162 as shown in FIG. 4. The microswitch 162 includes a pushbutton 162A which is adapted to be engaged by an extension 98A of the plate 98. Accordingly, when weight is placed on the platform 14 and the plate 98 is rotated, the extension 98A engages the pushbutton 162A of the switch 162 to depress the same and close the switch. On the other hand, when weight is removed from the platform 114, the switch is opened and the motor rotates in the opposite direction.

In operation, the object to be weighed is placed on the platform 14 and the platform moves downwardly in the conventional manner. At this point, a number of events occur. The switch 124 momentarily closes thereby applying a pulse of energy to the stepping coil 120 from the lead 118 thereby causing the armature 122A of the switch 122 to move from terminal 122B to terminal 122C. Simultaneously therewith, the bellows 154 engages the armature 134A of the switch 134 thereby closing the switch 134. Accordingly, the relay winding 130C will be energized through the circuit which includes the energized lead 118 and ground. Therefore, normally closed contacts 130A will open and normally open contacts 130B will close to connect the solenoid between the lead 118 and ground and thereby cause the solenoid 70 to be energized.

The energization of the solenoid 70 causes the core 68 to be pulled downwardly against the bias of the spring 72 thereby pivoting the yoke 56 about its pivotal connection 48 so that the roller 50 engages the take-up reel 42 and disengages the roller 52 from the feed reel 38.

At the same time, the downward movement of the platform 14 causes the motor 76 to pivot to the position shown in FIG. 1 via the clockwise rotation of the plate 98 and also causes the extension 98A to depress the pushbutton 162A to close the switch 162 and change the direction of rotation of the motor.

Figure 3:
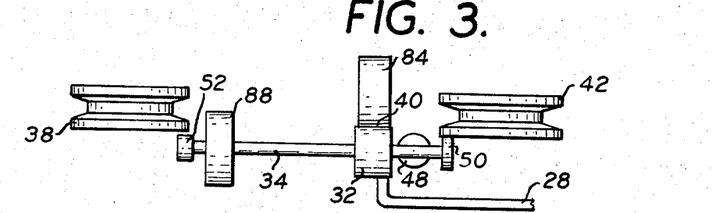
FIG. 3 is a detail view illustrating the arrangement of various elements during the initial positioning of the recording device shown in FIG. 1.

As a result of the above events, the elements which effect movement of the tape 36 will be in the positions indicated in FIG. 3 wherein the crown disc 28 is in engagement with the roller 32 and the roller 50 is in driving engagement with the take-up reel 42. However, in view of the fact that the yoke 56 has been pivoted in the counterclockwise direction about its pivot mount 48, as taken in FIG. 1, the roller 80 will be out of engagement with the roller 84. As the disc 16 rotates in response to the movement of the platform 14 to the loaded position, crown disc 28 will likewise rotate via the connection of the disc 16 with the roller 26 on the shaft 24, thereby causing the tape 36 to unwind from the feed reel 38 onto the take-up reel 42. As noted above, the motor 76 will also be energized. However, this will not initiate rotation of the shaft 34 since the roller 80 is not in contact with the roller 84. The take-up reel 42 will move the tape a distance proportional to the angle through which the scale disc 16 moved.

As noted hereinabove, the weight announcement segments are sequentially recorded on the tape 36 and are synchronized to the movement of the scale disc 16 so that when the scale disc 16 has moved to a point wherein the correct weight indicia 18 is visible through the viewing window, the particular weight announcement segment related to that indicia is adjacent the read head 46.

It is to be noted that during the time that the tape is unwound from the feed reel 38, the amplifier 132 is disconnected from the armature 122A by virtue of the fact that the contacts 130A are now open.

Figure 5:
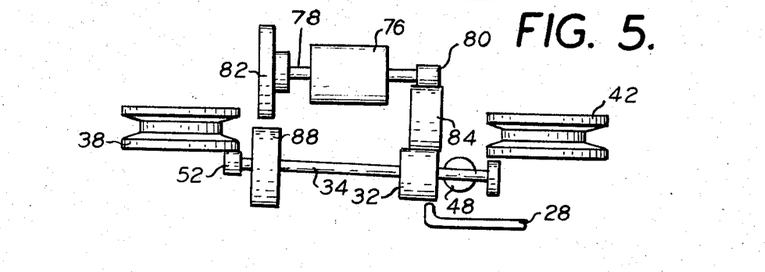
FIG. 5 is a detail view similar to FIG. 3 illustrating the arrangement of the drive elements during the time a weight announcement segment is being read-out.

However, when the platform comes to rest in the loaded position, a static condition will exist. The spring 160 will cause the bellows 154 to deflate until the armature 134A of the switch 134 is permitted to rise (a specified time interval after the platform 14 has reached its equilibrium position). Thus, the relay 130 will be de-energized thereby closing the contacts 130A to connect the read head 44 through to the armature 122A of the switch 122 and open the contacts 130B to de-energize the solenoid 70. The yoke 56 will then pivot about the pivotal connection 48 under influence of the spring 72 until the roller 52 engages the feed reel 38. Additionally, the roller 80 will now engage the idler roller 84 so a driving connection will exist between the motor 76 and the shaft 34 through the rollers 80, 84 and 32, as shown in FIG. 5. The direction of rotation of the motor 76 is such that the shaft 34 will rotate in a direction which will cause the roller 52 to rotate the feed reel 38 in the rewind direction thereby moving the tape 36 in the direction indicated by the arrowhead 164 in FIG. 2.

As the control signal preceding the weight announcement segment to be read-out passes the head 44, a pulse will be produced which will be applied to the input of flip-flop 136 through the lead 128, the switch 122 and the stepping coil 122E. This pulse will cause the armature 122A to step around to the terminal 122D. Additionally, the pulse causes the flip-flop to change states thereby causing the relay winding 138 to be energized. Consequently, the contacts 138A close thereby connecting the read head 46 to the speaker 142 through the amplifier 140.

As the weight announcement segment moves past the read head 46, an audio indication of the value of the weight on the platform is emitted by the speaker 42. After the weight segment has been read-out, the succeeding control signal is detected by head 44 which produces an amplified pulse via amplifier 132 and applies the same to flip-flop 136 through the coil 122E. The armature 122A will therefore move to its normal position (in contact with terminal 122A) and the flip-flop will be reset. Thus, the relay winding 138 will be deenergized thereby disconnecting contacts 138A to prevent further weight announcements. Accordingly, albeit other weight announcement segments may move past the read head 46, no audible indication will be emitted by the speaker. Additionally, since the armature 122A of the switch 122 has been stepped back to the unconnected terminal 122B of the switch, no further pulses will be applied to either stepping coils or the flip-flop 136 albeit control signals continually move past the read head 44 during rewind.

At this point, two events can occur. If the weight remains on the platform 14, the tape will be rewound on the feed reel 38 at "read" speed until the strip 302 shorts the segments 304 and 306 thereby causing the motor 76 to be de-energized, as noted above. However, if it is desired to quickly rewind the tape 36, the weight is removed from the platform to permit the platform to return to its rest position. Thus, the motor 76 will return to its rewind position, as shown in FIG. 9 where the roller 82 is in engagement with the roller 88. Additionally, the plate 98 will pivot away from the switch 162 thereby permitting the motor 76 to reverse its direction of rotation. At this point, the elements will be in the position indicated in FIG. 9 so that the motor can quickly rewind the tape 36 onto the feed reel 38. The motor will remain energized until the stop signal is detected, at which point the motor will be de-energized and the apparatus will be ready to receive another object on the platform 14.

To prevent against accidental or partial operation of the annunciator, as when a child quickly jumps on and off the platform 14, a single-pole single-throw on-off switch 117 may be provided to prevent operation of the circuit shown in FIG. 8 until an adult operates the switch to the closed position. Alternatively, knob 123 connected to the armature 122A of the switch 122 by the connection indicated by the dashed line 125 may be provided. The knob 123 is located externally of the apparatus and may be rotated to an indicated "start" position corresponding to the connection of armature 122A with terminal 122B prior to placing a weight on the platform 14 thereby insuring proper operation of the device.

Accordingly, a weight annunciator has been disclosed which is relatively simple in construction, reliable in operation, and eliminates the need to obtain a visual indication of the weight recorded on a disc or the like.

Figure 10:
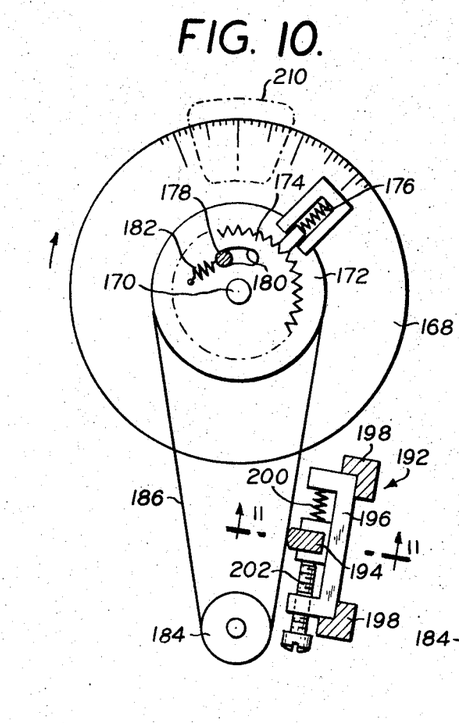
FIG. 10 is a top plan view, partially in diagrammatic form, of a modified embodiment of a weight annunciator constructed according to the present invention.
Figure 11:
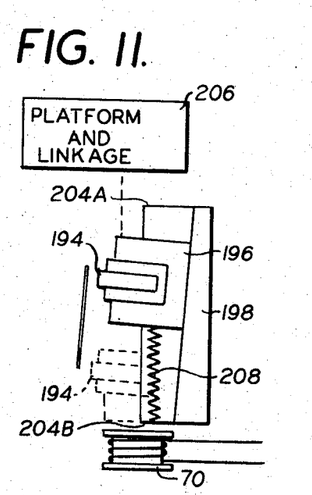
FIG. 11 is a vertical sectional view taken along the line 11—11 of FIG. 10, illustrating the read-out apparatus of the present invention and showing the platform linkage diagrammatically.
Figure 12:
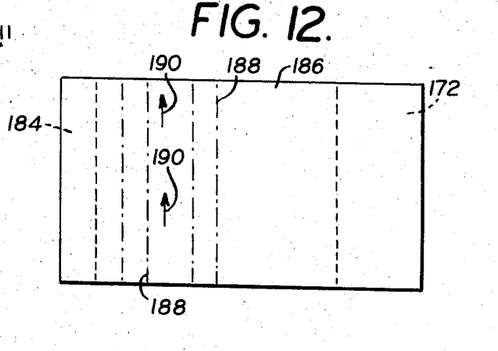
FIG. 12 is a front elevational view of the record used in the modified embodiment of the weight annunciator shown in FIG. 10.

FIGS. 10–12 illustrate a modified embodiment of the weight annunciator constructed according to the present invention and include a scale disc 168 similar to the disc 16. The disc 168 is conventional in construction and is adapted to be rotated by a linkage mechanism (not shown) between the platform and the disc, as is conventional in most scales. The disc rotates about a central shaft 170, as shown in FIG. 10. Also rotatably mounted on the shaft 170 is a cylinder 172 which fixedly mounts a ratchet wheel 174 thereon. A spring-biased pawl 176 is engageable with the ratchet wheel 174. That is, the pawl 176 is engageable with the teeth of the ratchet wheel and, once a tooth has passed the pawl, the pawl immediately seats in the bottom of the next tooth. In effect, therefore, the pawl provides an indexing mechanism which indexes the ratchet wheel and thereby the cylinder 172 through specific incremental steps. In other words, the cylinder cannot move to a position intermediate any teeth because the spring biased pawl will immediately seat itself in the bottom of the next tooth as soon as the succeeding tooth has passed the pawl thereby moving the ratchet wheel and the cylinder in specific increments.

The cylinder and ratchet wheel are controlled by the movement of the disc 168 by means of a pin 178 extending upwardly from the scale disc 168. The pin 178 is received in an elongated arcuate slot 180 which is larger than the pin so that the pin can move back and forth within the slot, as shown in FIG. 10. Under normal conditions, the pin 178 is biased into engagement with the left-hand end of the slot 180 by the spring 182.

As the scale disc 168 rotates, the pin 178 will move forwardly until it engages the right-hand end of the slot 180, thereby rotating both the cylinder 172 and the ratchet wheel 174. The pawl 176 indexes the ratchet wheel and thereby the cylinder in specific increments. It is to be noted that if the rotation of the disc 168 would tend to move the ratchet wheel to an intermediate position, the loose connection between the pin 178 and the slot 180 will permit the pawl to index the ratchet wheel fully to the next tooth position for the reasons noted below.

Extending between the cylinder 172 and an idler cylinder 184 is an endless belt 186. As shown in FIG. 12, the endless belt has weight announcements segments recorded thereon in columnar form, as indicated by the dashed and dotted lines 188. In other words, each column contains a different weight announcement. The belt 186, which may be a magnetic recording, is read-out in a vertical direction, as indicated by the arrowheads 190. The belt is adapted to be moved past a reading station designated generally by the reference numeral 192. The reading station 192 includes read head 194 which is received between the arms of a U-shaped holder 196. The holder 196 is mounted between spaced guides 198. A spring 200 biases the read head 194 against an axially movable adjusting screw 202 which is adapted to adjust the read head 194 laterally, as shown in FIG. 10. The read head 194 is initially adjusted so that the read head will be in alignment with a column 188 when the belt 186 is indexed to a weight announcement column. The read head is movable between an upper stop 204A and a lower stop 204B. When an object is placed on the platform of the scale, appropriate linkage indicated generally by the reference numeral 206 causes the read head 194 to be depressed to a read position as indicated by the dotted lines in FIG. 11. A spring 208 normally biases the read head upwardly against the upper stop 204A. However, when a weight is placed on the platform, a solenoid 70 is energized to maintain the read head 194 in the read position. The solenoid 70 is similar in construction to the solenoid 70 illustrated in FIG. 1 and is operable by a switch similar to the switch and actuating arrangement of the bellows 154 as shown in FIG. 1. Thus, the solenoid 70 in FIG. 11 will remain energized until the platform has come to rest in the loaded position. A short interval thereafter (i.e., until the air has been expelled from the bellows) the solenoid 70 will be de-energized thereby releasing the read head 194. The read head is connected to suitable circuitry so that the information recorded on the belt may be converted into audible tones.

In operation, when an object is placed on the platform of the scale shown in FIGS. 10–11, the disc 168 rotates thereby causing the belt 186 to rotate past the reading station 192 via the pin 178, and the cylinder 172 and ratchet wheel 174. The pawl 176 insures that the belt 186 will be moved in incremental steps so that a particular column 188 will always be in alignment with the read head 194 when the platform of the scale reaches the loaded position. The columns 188 are synchronized with the rotation of the scale disc 168 so that the weight announcement finally arriving at the reading station will indicate the weight which is indicated in a viewing aperture 210 on the scale.

During movement of the platform, the read head 194 will be depressed and the solenoid 70 will be energized to maintain the read head in the read position. A short time after the platform has reached the loaded position, the electromagnet will be de-energized thereby releasing the read head. Accordingly, as the read head travels upwardly it will read-out the information in the column 188 in juxtaposition to the read head. Since movement of the belt 186 causes the columns to move transverse to the read head 194 during movement of the belt, the read circuitry need not be energized and de-energized as in the embodiment shown in FIGS. 1–9. After the object is removed from the platform of the scale, the scale disc 168 rotates back to its original position thereby causing the belt 186 to do likewise through the connections of the pin 178, slot 180, cylinder 172 and ratchet wheel 174. Accordingly, the mechanism will now be ready to receive another object to be weighed.

Figures 13, 14, 15:
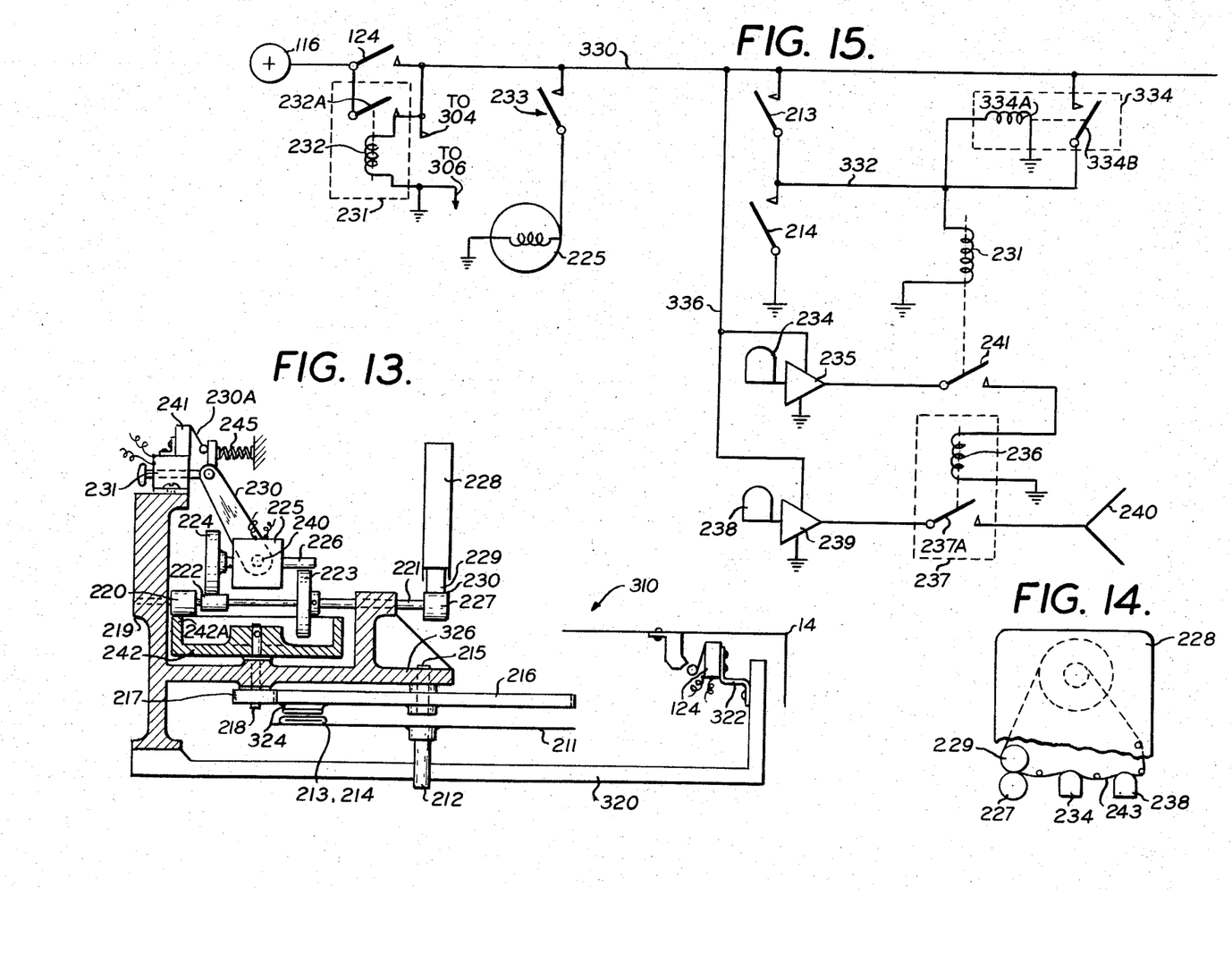
FIG. 13 is a front elevational view, partially in section, of a further modified embodiment of a weight annunciator constructed according to the present invention.
FIG. 14 is a detailed view of the tape recording section thereof.
FIG. 15 is a schematic circuit wiring diagram of said modified embodiment.

A further modified embodiment of a weight annunciator constructed according to the present invention is shown in FIGS. 13–15 wherein reference numerals similar to those shown in FIGS. 1–12 indicate identical elements.

Accordingly, the weight annunciator 310 shown in FIG. 13 includes a bed 320 to which is connected a micro-switch 124 by a bracket 322. Journaled in the bed 320 is a central shaft 212 which mounts a scale disc 211 similar to the discs 16 and 168. The disc 211 is adapted to be rotated through an angle proportional to the weight placed on the platform 14 via a conventional linkage arrangement (not shown). The scale disc 211 mounts circumferentially spaced switches 213 and 214 which are adapted to be operated by a magnet 324 which is mounted on the undersurface of a gear 216. In other words, as the magnet 324 passes above the respective switches 213 and 214, the switches will close.

The bed or frame 320 includes a shelf portion 326 which receives a shaft 215 adjacent the end thereof. The gear 216 is rotatably mounted on the shaft 214. Additionally, a shaft 218 is journaled in the shelf 326 and mounts a pinion 217 adjacent one end thereof which is in meshing engagement with the gear 216. The other end of the shaft 218 receives a disc 242 having an upstanding peripheral rim 242A. The wall 242A of the disc 242 engages a roller 220 which is affixed to a shaft 221 which, in turn, is rotatably mounted on the bed 320, as shown in FIG. 13. Additionally, spaced rollers 222 and 223 are also affixed to the shaft 221.

The roller 222 is normally in engagement with a roller 224 connected to the output shaft 226 of a motor 225. Additionally, the roller 223 is adapted to be engaged by the shaft 226 of the motor 225 while the rollers 222 and 224 are moved out of engagement with each other, as noted in greater detail below. It is to be noted that roller 222 is of smaller diameter than the roller 224 whereas the roller 223 is of much larger diameter than the shaft 226. Accordingly, the speed of rotation of the shaft 221 will be greater when the rollers 224 and 222 are in driving engagement than when the shaft 226 and roller 223 are in driving engagement. The paths of rollers (222,224 and 226,223) are moved into and out of engagement by alternately rotating the motor 225 about a pivot 240 by means of a lever 230 and a solenoid 231.

To be more specific, the frame of motor 225 is connected to the lever 230 at one end and the core of the solenoid 231 is connected to the lever 230 at the other end. Additionally, a spring 245 is also connected to the lever 230 at the end adjacent the solenoid and biases the lever in a clockwise direction, as taken in FIG. 13, so that the shaft 226 engages the roller 223 and the rollers 222 and 224 are disengaged. However, when the solenoid winding is energized, the solenoid 231 causes the lever 230 to move in the clockwise direction thereby engaging shaft 226 and roller 223 and causing rollers 222 and 224 to disengage. At the same time, an extension 230A of the lever 230 engages a switch 241 and closes the same, as noted in greater detail below.

The weight announcement segments are recorded on a tape 243 which is housed in a conventional cassette 228. The tape is continuous and is driven in one direction only by means of a roller 227 mounted on the end of the shaft 221. That is, provision is made in the bed 320 to receive the tape cassette 228. The cassette 228, as shown in FIG. 14, includes a roller 229 adjacent the tape 243. When the cassette is properly mounted on the bed 320, the tape 243 will be pinched between the rollers 229 and 227 and move by virtue of the rotation of the roller 227 in the conventional manner. Additionally, read head 234 and 238 are supported on the bed or frame 320 adjacent the tape 243, as shown in FIG. 14. Moreover, it is to be understood that the tape 243 is similarly provided with a conductive strip 302 of the type shown in FIG. 7. The conductive strip 320 is placed adjacent the beginning of the tape and the tape is likewise adapted to bridge conductive segments 304 and 306 in the manner indicated above with respect to description of FIG. 7.

The circuit diagram of the weight annunciator 310 is shown in FIG. 15 and includes the source 116 and the normally open momentary operated switch 124 which connects the source 16 with a lead 330. Connected to the lead 330 is one end of a relay winding 232 of a relay 231. The other end of the relay winding 232 is connected to ground. The end of the relay winding 232 connected to the lead 330 is also connected to the portion or segment 304 of the roller 308. In a similar manner, the other end of the relay winding which is connected to ground is also connected to the conductive portion 306 of the roller 308. Accordingly, it will be obvious that when the conductive strip 302 bridges the portions 304 and 306 of the roller 308, the relay winding 232 will be effectively shorted. The end of the relay winding 232 connected to the lead 330 is also connected to contacts 232A which are adapted to connect the top of the relay winding with the source 16 when the contacts are closed.

One end of the motor 225 is connected to ground. The other end of the motor is connected to the lead 330 through a time delay or motion sensing switch 233 of a type similar to the switch 134 of FIG. 1. That is, the switch 233 is adapted to close only after the platform 14 has reached an equilibrium position after weight has been applied thereto. The switch 213 is adapted to connect a lead 332 to the lead 330 when the switch is closed. Additionally, when the switch 214 is closed it is adapted to connect the lead 332 to ground. Connected to the lead 332 is one end of a relay winding 334A of a relay 334. The other end of the relay winding 334A is connected to ground. The relay 334 further includes normally open contacts 334B which are adapted to close and connect the lead 330 with the lead 332 when the relay winding 334A is energized.

The solenoid 231 is connected between the lead 332 and ground and, as noted above, controls the operation of the switch 241. That is, when the solenoid 231 is energized the switch 241 is closed. The single-pole single-throw normally open switch 241 is connected between the series circuit comprising the read head 234 and amplifier 235, and one end of the winding 236 of a relay 237, the other end of which is connected to ground. Thus, when the switch 241 is closed, the amplifier 235 will be connected to the relay winding.

The energization of the winding 236 of the relay 237 causes the normally open contacts 237A to close thereby connecting the series circuit of the read head 238 and amplifier 239 with a speaker 240. The amplifiers 235 and 239 are energized via a lead 336 which is connected to a lead 330.

In operation, when weight is added to the platform 14, the switch 124 is momentarily closed, as noted above. Thus, the relay winding 232 of the relay 231 is momentarily energized thereby to close the contacts 232A. Accordingly, the relay winding 232 will remain energized via the contacts 232A. Additionally, the source 116 will remain connected to the lead 330 through these contacts.

As the platform moves downwardly under the force of the weight, the scale disc 211 is rotated through an angle corresponding to the value of the weight on the platform 14, in conventional manner. Simultaneously, the switches 213 and 214 will be rotated through the same angle. When the platform 14 finally comes to an equilibrium position, the switch 233 will close in a manner similarly to the closure of the switch 134. Thus, the motor 225 will become energized. Since the solenoid 231 is de-energized at this point, the shaft 226 will be in engagement with the roller 223 thereby causing the shaft 221 to correspondingly rotate quickly. This action causes the tape 243 to move via the driven roller 227 and the roller 229 and also causes the disc 242 to rotate via the connection of the roller 220 and the rim 242A. Rotation of the disc 242 causes concurrant rotation of the gear 216 via the pinion 217. Accordingly, the gear 216 rotates until the magnet 324 trips or closes the magnetic switch 213.

As shown in FIG. 15, closure of the switch 213 connects the relay winding 334A with the lead 330 thereby energizing the same. The relay then establishes a holding circuit by closing the contacts 334B to connect the lead 330 with the lead 332. Simultaneously therewith, the solenoid 231 will be energized since it is connected between the lead 332 and ground. Thus, the core of the solenoid will move toward the right as taken in FIG. 13 thereby rotating the motor 225 so that rollers 222 and 224 disengage and rollers 223 and shaft 226 engage. The shaft 221 will now rotate at a much slower "read" speed so that the message on the tape can be clearly understood. Of course, it is to be understood that the weight announcements on the tape are synchronized with the movement of the shaft 212 and, via the gear 216, with the weight disc 211 so that the weight announcement corresponding to the indication on the disc 211 will be located at the read stations. As noted above, energization of the solenoid 231 also causes the switch 241 to close.

When the switch 241 closes, the head 234 will be connected to the relay winding 236 via the amplifier 235. The tape may have control signals recorded thereon in a manner similar to that noted hereinabove. Accordingly, when the first control signal is detected by the head 234 and amplified by the amplifier 235, the relay winding 236 will be energized to close the contacts 237A. Accordingly, the weight announcement will then be detected by the head 238 and amplified by the amplifier 239 and applied to the speaker 240 so that the weight will be announced. After the weight segment has moved past the read head 238, the next control signal will be detected by the head 234 thereby to again apply a pulse to the bistable relay winding 236 to cause the contacts 237A to open.

At this point, the gear 216 which is likewise rotating at the slower speed will cause the magnet 324 to momentarily close the switch 214 in a manner similar to the actuation of the switch 213. Thus, both the solenoid 231 and the relay winding 334A will be grounded thereby causing the contacts 334B to open and the shaft 226 to again engage the roller 223 and to rotate the shaft 221 at a relatively high speed as compared to the "read" speed. Since the solenoid 231 is de-energized, the contacts 241 open so that no further pulses can be applied to the relay winding 236 and therefore no further weight announcements will be read-out.

The motor will continue rotating the tape 243 until the conductive strip 302 bridges the portions 304 and 306 of the roller 308. Accordingly, the relay winding 232 will then become shorted whereby the contacts 232A will open and the system will become de-energized. Accordingly, all elements will assume their normal position so that another weight announcement may be made when another weight is placed on the platform 14.

While preferred embodiments of the invention have been shown and described herein it will become obvious that numerous omissions, changes and additions may be made in such embodiments without departing from the spirit and scope of the present invention. For example, commercial announcements or the like may also be recorded on the tape.

What is claimed is:

1. An announcement machine for use with a weighing machine of the type having a platform adapted to be moved from a rest to a loaded equilibrium position related to the value of a weight placed thereon comprising recording means having weight announcement segments sequentially recorded thereon, a reading station including reading means for converting the weight announcement segments into audible information, moving means responsive to the movement of said platform to the loaded position for moving said recording means to a position whereby the weight announcement segment associated with the value of the weight on said platform is positioned at said reading station, and operate means responsive to the cessation of movement of said platform after it reaches the loaded equilibrium position for effecting relative movement between said reading and recording means whereby the weight announcement positioned at said reading station is read-out.

2. An announcement machine as in claim 1, in which said record means comprises a magnetic tape stored on a feed reel and extending in a preselected path to a take-up reel whereby movement of said take-up reel in a first direction causes said tape to move along said preselected path, said reading station being located adjacent said preselected path, and said moving means comprises a first gear adapted to be rotated by said platform through an angle proportional to the distance between said rest and loaded positions, and a second gear between said first gear and said take-up reel for moving said take-up reel in response to the rotation of said first gear to unwind said tape from said feed reel to position the weight announcement segment substantially corresponding to the weight on the platform at said reading station.

3. An announcement machine as in claim 2, and a third gear for driving said feed reel in a direction to rewind said tape, a pivotally mounted shaft mounting said second and third gears and being movable between a first position in which second gear engages said take-up reel and a second position in which said third gear engages said feed reel, said operate means comprising pivot control means for moving said shaft from said second to said first position during movement of the platform and back to said second position after cessation of movement of the platform, and driving means engageable with said shaft when said shaft is in the second position to cause said third gear to rotate said feed reel in a rewind direction.

4. An announcement machine as in claim 3, and time delay means for maintaining said shaft in said first position for an interval of time after the platform has ceased moving.

5. An announcement machine as in claim 3, in which said driving means comprises a motor pivotally mounted with respect to said shaft and movable from a first position to drive said shaft at a first speed driving the read-out of said tape to a second position to drive said shaft at a second speed during rewind of said tape, and means for connecting said motor with the platform to pivot said motor from said second to said first position when a weight is placed on said platform.

6. An announcement machine as in claim 1, in which said moving means comprises linkage means between the platform and said record means for moving said record means a distance proportional to the distance between said rest and loaded positions of said platform.

7. An announcement machine as in claim 6, in which said record means comprises a magnetic tape having said weight announcement segments serially recorded thereon, a control signal recorded on said tape between each one of said segments; said reading means comprising a speaker, a read head for reading the signals recorded on said tape, and connect means responsive to a first control signal for connecting said read head with said speaker and for disconnecting said read head from said speaker after said weight announcement segment has been read-out.

8. An announcement machine as in claim 6, in which said record means comprises an endless belt having said weight announcement segments recorded in columns thereon, and said moving means comprises indexing means for aligning the column having the weight announcement corresponding substantially to the value of the weight on the platform at said reading station.

9. An announcement device as in claim 8, in which said reading means comprises a read head movable from a rest to a read position in response to movement of said platform, holding means for retaining said read head in said read position until the platform reaches said loaded position, and biasing means for biasing said read head to the rest position whereby said read head causes the juxtaposed column to be read-out during movement of the read head from the read to the rest position.

10. An announcement machine as in claim 8, in which said weighing machine includes a disc connected with the platform and being rotatable through an angle proportional to the value of the weight on the platform, a ratchet wheel having a plurality of teeth related to said columns on said endless belt and in driving engagement with said endless belt whereby movement of said ratchet wheel one tooth position causes concomitant movement of said one column position, said indexing means including a pawl engageable with said ratchet wheel through whole tooth increments, and a loose connection adapted to connect said ratchet wheel with said disc to prevent partial-tooth movement of said ratchet wheel.

11. An announcement machine as in claim 9, in which said loose connection comprises a pin on the disc, an elongated arcuate slot in said ratchet wheel receiving said pin therein adjacent one end thereof whereby said pin is adapted to travel a preselected distance before engaging the other end of said slot, and biasing means for biasing said pin to said one end of said slot.

12. An audio scale comprising a platform adapted to be moved from a rest to a loaded equilibrium position wherein the loaded position is related to the weight of an object placed on the platform, recording means having weight announcement segments sequentially recorded thereon, a reading station including reading means for converting the weight announcement segments into audible information, a scale disc connected to said platform and having indicia thereon for visually indicating the weight of the object on the platform, moving means connected between said scale disc and said recording means for moving said recording means to a position wherein the weight announcement segment associated with the weight of the object on the platform is positioned at said reading station, and operate means connected to said platform and responsive to the cessation of movement of the platform after it reaches the loaded equilibrium position for effecting relative movement between the reading and recording means whereby the weight announcement positioned at said reading station is read-out to emit an audio indication of the value of the weight on the platform.

13. An audio scale as in claim 12, in which said record means comprises a magnetic tape having said weight announcement segments serially recorded thereon, a control signal recorded on said tape between each one of said segments; said reading means comprising a speaker, a read head for reading the signals recorded on said tape, and connect means responsive to a first control signal for connecting said read head with said speaker and for disconnecting said read head from said speaker after a weight announcement segment has been read-out.

14. An audio scale as in claim 12, in which said record means comprises a magnetic tape stored on a feed reel and extending in a preselected path to a take-up reel whereby rotation of said take-up reel in a first direction causes said tape to move along said preselected path, said reading station being located adjacent said preselected path, said moving means comprising a first gear connected to said scale disc and adapted to be rotated by said scale disc through an angle proportional to the angle through which the scale disc is rotated, and a second gear between said first gear and said take-up reel for moving said take-up reel in response to the rotation of said first gear to unwind said tape from said feed reel to position the weight announcement segment substantially corresponding to the weight on the platform at said reading station.

15. An audio scale as in claim 12, in which said record means comprises an endless belt having said weight announcement segments recorded in columns thereon, and said moving means includes indexing means connected to said scale disc for aligning the column having the weight announcement corresponding substantially to the value of the weight on the platform at said reading station.

16. An audio scale comprising a platfrom adapted to be moved from a rest to a loaded equilibrium position wherein the loaded position is related to the weight of an object placed on the platform, recording means having weight announcement segments recorded thereon, a reading station, a scale disc connected to said platform and adapted to be rotated through an angle proportional to the movement of the platform, moving means operatively associated with said disc for effecting relative movement between said recording means and said reading station to position the weight announcement segment corresponding to the angle of rotation of said disc at said reading station, and reading means responsive to movement of said platform to the loaded equilibrium position for converting the weight announcement segment positioned at said reading station into audible information.

17. An audio scale as in claim 16, in which said operate means comprises a magnetic switch, and said actuating means comprises a magnet.

18. An audio scale as in claim 16, in which said reading means comprises converting means for converting the signals on said record means into sound, and operate means carried on said disc for operating said converting means; said moving means comprising a motor for moving said recording means past said reading station, a gear connected to said motor and proportionately rotatable with said recording means, and actuating means on said gear for actuating said operate means when said gear has rotated through an angle whereby said actuating means is in juxtaposition to said operate means.

19. An audio scale as in claim 18, in which said motor is adapted to rotate said recording means at a relatively fast speed to position said weight announcement segment at said reading station, and speed changing means responsive to the operation of said operate means for changing the speed of movement of said record means to permit conversion of the signals on said record means into comprehensible information.

20. An audio scale as in claim 19, in which said moving means further comprises a stop on said recording means, and means responsive to said stop for causing said motor to stop operating.

21. An audio scale as in claim 20, in which said recording means comprises an endless tape, and said stop means is located at the beginning of said weight announcement segments.

* * * * *